United States Patent [19]

Aron et al.

[11] 4,367,622

[45] Jan. 11, 1983

[54] PICK-UP DEVICE

[75] Inventors: Jérôme Aron, Bouxwiller; Michel Quirin, Wasselonne; Albert Wattron, Marmoutier, all of France

[73] Assignee: Belrecolt S.A., Marmoutier, France

[21] Appl. No.: 253,220

[22] Filed: Apr. 13, 1981

[30] Foreign Application Priority Data

Apr. 15, 1980 [FR] France ............................... 80 08668
Jul. 22, 1980 [FR] France ............................... 80 16400

[51] Int. Cl.³ .................... A01D 43/00; A01D 65/00; A01D 89/00
[52] U.S. Cl. .................................. 56/364; 56/327 R; 171/14
[58] Field of Search ............... 56/364, 192, 13.6, 370, 56/327 R; 171/14, 27; 172/44

[56] References Cited

U.S. PATENT DOCUMENTS

| 940,121 | 11/1909 | Bleashack | 171/14 |
|---|---|---|---|
| 2,321,537 | 6/1940 | Williams | 172/44 |
| 2,994,177 | 8/1961 | Bruner | 56/327 R |
| 3,330,363 | 7/1967 | Greedy | 171/14 |
| 3,435,900 | 4/1969 | Weichel | 45/364 |
| 3,676,988 | 7/1972 | Hauser-Leinhard | 56/192 |
| 3,690,383 | 9/1972 | Malley et al. | 172/44 |
| 3,745,754 | 7/1973 | Gronberg | 56/364 |
| 3,747,313 | 7/1973 | Denzin | 56/364 |
| 3,772,865 | 11/1973 | Ruporecht et al. | 56/192 |
| 3,872,657 | 3/1975 | Ramacher et al. | 56/364 |
| 3,962,854 | 6/1976 | van der Lely | 56/370 |
| 4,047,573 | 9/1977 | Aoyama | 171/14 |
| 4,184,313 | 1/1980 | Broijl | 56/370 |
| 4,203,277 | 5/1980 | Kaetzel | 56/370 |
| 4,211,061 | 7/1980 | Richey | 56/327 R |
| 4,221,265 | 9/1980 | Pratt | 56/327 R |
| 4,234,045 | 11/1980 | Porter | 56/327 R |
| 4,244,163 | 1/1981 | Gantzer | 56/13.6 |

Primary Examiner—Paul J. Hirsch
Attorney, Agent, or Firm—Ernest F. Marmorek

[57] ABSTRACT

An arrangement for gathering and lifting forage lying on the ground includes at least a carrier mounted on a support for rotation about an upright axis, a skirt mounted on the lower portion of the carrier, a receiving device, and a guiding arrangement extending between the skirts and reaching under the same and the receiving device. The forage lifted by the skirts may be transferred to the guiding arrangement by a roller which is situated at least partially underneath the skirt upstream of the leading end of the guiding arrangement. The guiding arrangement may include a guiding plate, a conveyor belt, or an elevator arrangement including a plurality of rakes. When two carriers with skirts mounted thereon are being used, the trajectories of the skirts slightly overlap one another, the skirt or skirts being flexible and having peripheral projections which reach between one another.

13 Claims, 11 Drawing Figures

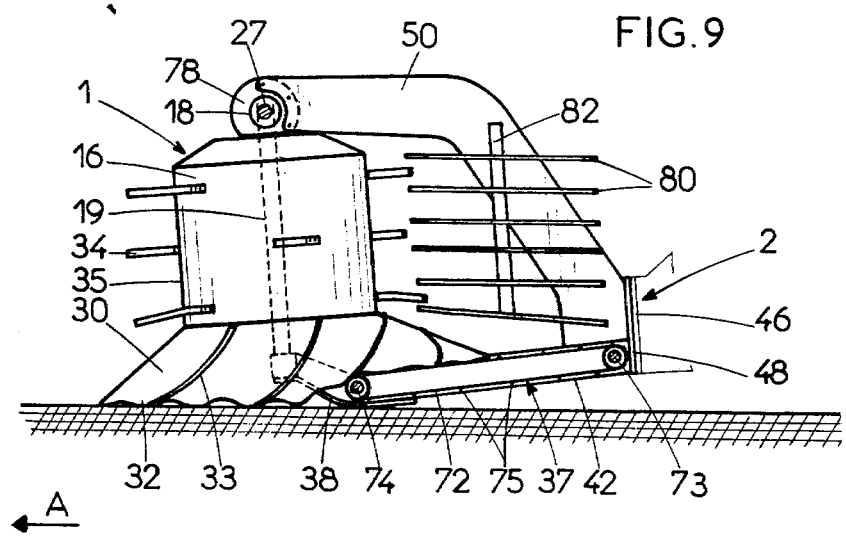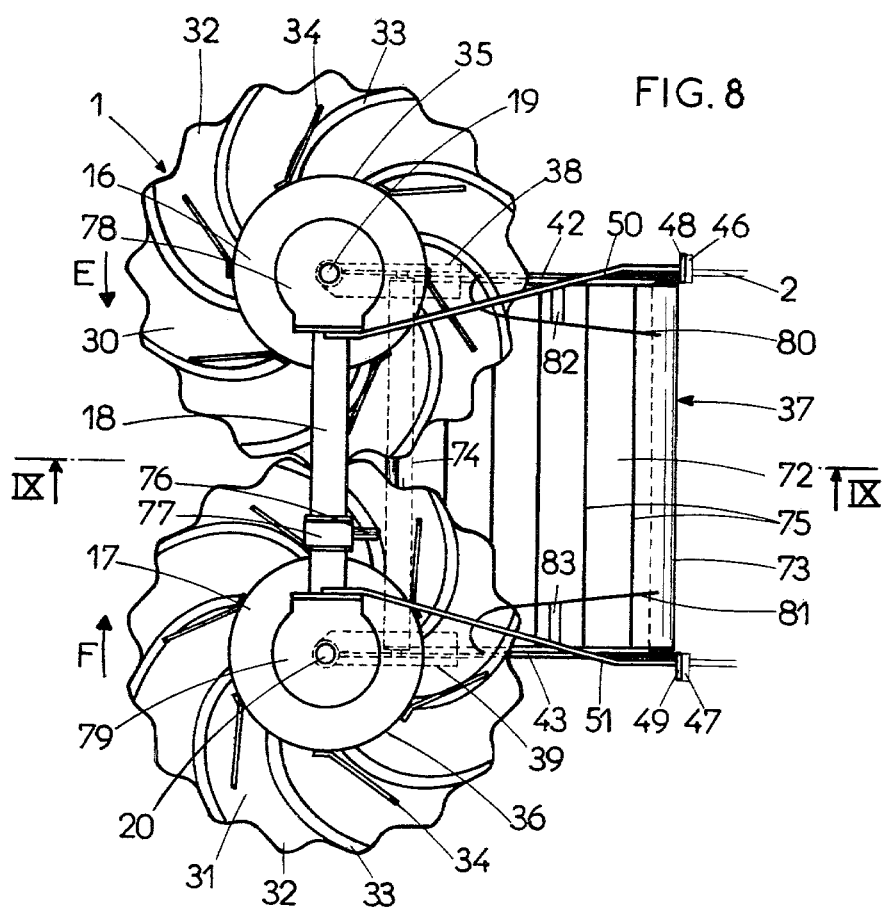

PICK-UP DEVICE

BACKGROUND OF THE INVENTION

The present invention relates to a device for gathering and lifting forage situated at the level of the ground, such as cut herbage like grass, cereals, hay or the like, lying on the field. Still more particularly, the present invention relates to an agricultural implement capable of performing this function and adapted to be connected to forage harvesters, balers, or even to self-propelling or pulled self-loading machines used to collect forage.

The arrangements of this type which are currently in use, particularly in machines operative for harvesting and/or collecting cut forage or herbage, are usually constructed as picking-up devices. A picking-up device of this type customarily includes a substantially horizontal rotatable shaft which is equipped with outwardly extending metallic tines. This type of device has an important drawback that it is relatively difficult to make and, consequently, quite expensive. Another disadvantage of the device of this type is that the tines occassionally break when they encounter an obstacle, such as a stone lying on the field. The resulting broken-away tines or tine portions then constitute debris which can cause considerable damage if it is, for instance, forwarded to the chopping unit of a forage harvester where it can break or otherwise damage the cutting elements, or if it reaches the compression channel or chamber or the tying arrangement of a baler. Moreover, when this debris is permitted to remain in the collected and/or baled forage or herbage, it may cause injury to the animals to which it is eventually fed.

Because of the relatively limited operating width of the device of this type, the agricultural products have to be arranged in rows first, such as windrowed when the products are cut herbage. The need for this additional preliminary operation requires the employment of additional machinery and manpower, such as a windrowing machine and the operating personnel therefor, which takes a certain amount of additional time and consumes a certain amount of additional energy.

Finally, the forage harvesters or balers have to be provided with means, such as an auger, for moving the picked-up forage which enters the machine over the entire width of the picking-up device to a channel in which the gathered forage is compressed or chopped, depending on the type of the machine.

SUMMARY OF THE INVENTION

One of the principal objects of the invention is to avoid the above-discussed disadvantages of the arrangements for gathering and lifting cut forage.

A further object of the present invention is to develop an arrangement of this type which does not require any preliminary operations prior to the use thereof for gathering and lifting the objects.

A concomitant object of the invention is to so design the arrangement as to be simple in construction, inexpensive to manufacture, easy to operate and maintain, and reliable nevertheless.

Further objects and advantages of the invention will be set forth in part in the following specification and in part will be obvious therefrom without being specifically referred to.

With the above and other objects of the invention in view, the invention consists in the novel arrangement for gathering and lifting objects situated at the level of the ground, particularly cut herbage, produce and similar agricultural products, which arrangement comprises, in combination, a support movable in an advancing direction on the ground, at least one carrier mounted on the support for rotation about an upright axis which is slightly inclined in the advancing direction as considered from below to above, means for rotating the carrier about its axis at a speed superior to 50 rpm, a flexible deformable skirt mounted on the lower portion of the carrier for rotation therewith and contacting the ground at its forward section as considered in the advancing direction, means cooperating with the skirt for guiding the objects gathered and lifted by the skirt rearwardly from the skirt, and a receiving device arranged at the rear end of the guiding means.

During the operation of the arrangement, the skirt passes underneath the forage to be gathered, closely following the irregularities of the ground, and transports the forage on its upper surface without damaging such forage. The skirt is advantageously shaped as a truncated cone, or at least substantially so, and is provided at its periphery with projections which improve the engagement of the skirt with the forage to be gathered. When the arrangement of the invention is provided with more than one carrier-skirt unit or assembly, the projections of two neighboring skirts preferably mesh or interleave with one another so that the trajectories of movement of these neighboring skirts slightly overlap. This ensures that the skirts lift all the forage lying on the ground, including those which is situated between the two neighboring carriers.

Furthermore, the use of the carrier-skirt unit or units renders it possible to dispense with the previously required windrowing operation. In effect, the carrier-skirt units operate in a manner resembling that of a windrowing machine or implement and collect the forage scattered over a wide area by themselves.

The gathering and lifting arrangement according to the present invention also renders it possible to significantly simplify the balers or forage harvesters cooperating with this arrangement. The forage gathered by the carrier-skirt unit or units and lifted thereby from the ground is brought together in a relatively narrow stream, so that it is possible to omit the auger which is commonly used for this purpose in conventional harvesters or balers cooperating with picking-up arrangements known from the prior art.

Because of the absence from the arrangement of the invention of any metallic tines which would have to contact the ground in order to pick up the forage therefrom, the arrangement according to the present invention does not pose any danger either to the processing mechanisms or to the livestock from broken tines.

In accordance with another feature of the present invention, the guiding means extends from a point located underneath the flexible deformable skirt or skirts substantially all the way to the receiving device. This results in excellent guidance of the forage to the receiving device and all losses are avoided beginning with the moment when the flexible deformable skirt first engages and lifts the forage. The guiding means can be constructed, for instance, as a guiding plate, as a conveyor belt, or as an oscillating member. There may also be provided entraining means which cooperates with the guiding means and is situated between the carrier-skirt units and the receiving device. The use of this entraining means facilitates the transportation of the forage, especially when it is green cut forage and, consequently, is heavy.

When the guiding means is constructed as a guiding plate, a substantially horizontal roller can advantageously be provided at the forward end of the guiding plate to facilitate the transfer of the forage from the skirt or skirts onto the guiding plate. This roller can be driven in rotation either by frictional engagement between the same and the deformable flexible skirt or skirts, or by driving means which assures that the roller will be positively and reliably rotated. Such driving means may be constructed as a chain transmission, a belt transmission, a connecting rod, a set of bevel gears, a hydraulic motor or the like.

In accordance with still another important feature of the invention, the guiding means includes or is mounted on at least one skid which extends forwardly to below the skirt or skirts and which engages the ground. This skid makes it easy to move the arrangement of the invention on the ground and ensures that the distance between the guiding means and the ground is maintained constant. Moreover, the shaft about which the respective carrier is being rotated can be attached to the skid, which rigidifies or reinforces the arrangement of the present invention.

BRIEF DESCRIPTION OF THE DRAWINGS

FIG. 8 is a view similar to FIG. 7 but showing still another modification;

FIG. 9 is a sectional view taken along the line IX—IX of FIG. 8;

DETAILED DESCRIPTION OF THE PREFERRED EMBODIMENTS

Figure 1:
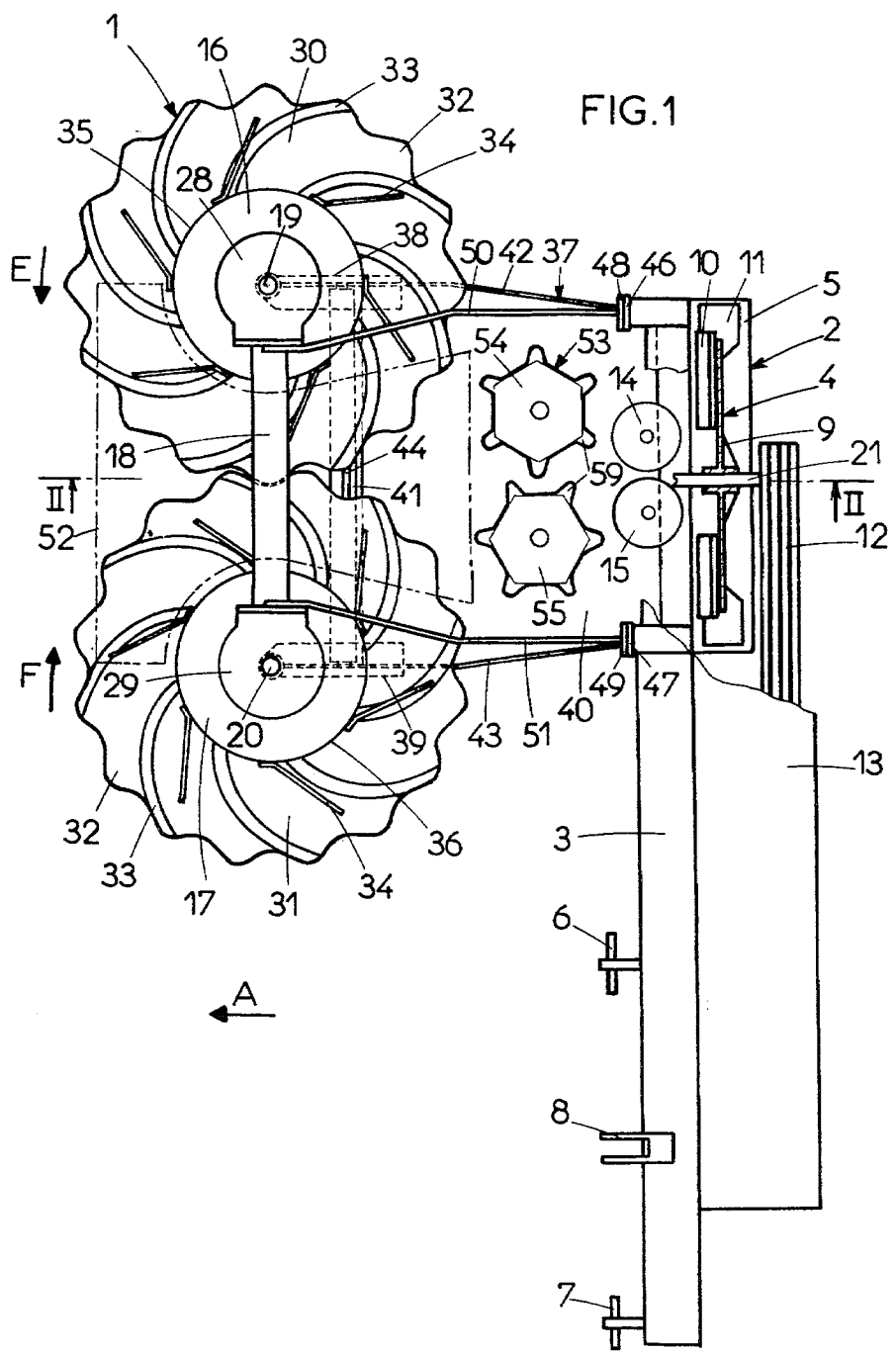
FIG. 1 is a partially sectioned top plan view of the gathering arrangement of the present invention.
Figure 2:
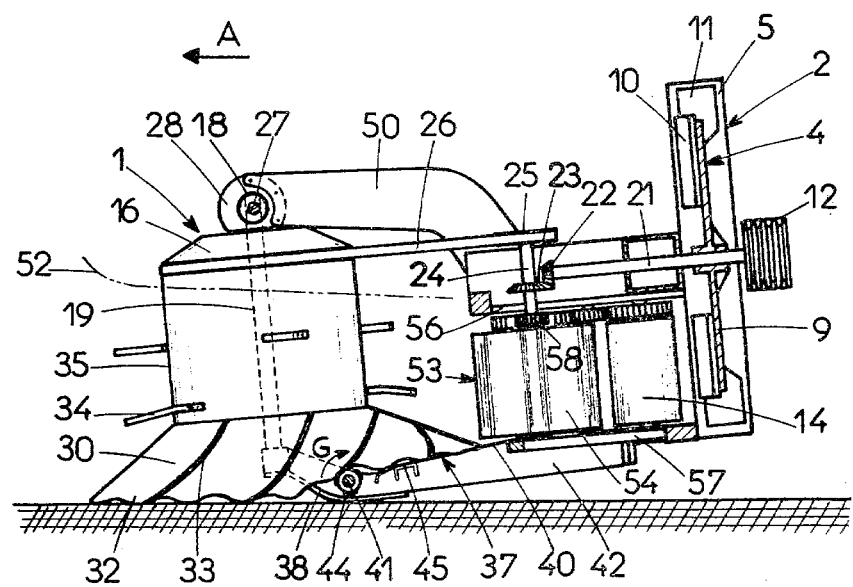
FIG. 2 is a sectional view taken on line II—II of FIG. 1.

In carrying the invention into effect in one of the embodiments which has been selected for illustration in the accompanying drawing and for detailed description in this specification, and referring now particularly to FIGS. 1 and 2, the gathering and lifting arrangement 1 of the present invention is shown as being connected to a forage harvester 2, by way of a non-limiting example of use of the arrangement 1. The harvester includes, among others, a chassis or frame 3 on which there is mounted a chopping and ejection mechanism 4 which is accommodated in a casing 5. The frame 3 is equipped with a pair of lower hitching brackets 6 and 7 and a single upper hitching bracket 8, by means of which the frame 3 can be coupled to the conventional coupling means of a non-illustrated tractor.

The chopping and ejection mechanism 4 comprises a wheel 9 provided with cutting elements 10 and with vanes 11. The wheel 9 is caused to rotate by the output shaft of the tractor, via a transmission including a non-illustrated universal jointed shaft and a belt transmission 12. The belts of the belt transmission 12 are at least partially protected by a cover 13. A pair of compressing rollers 14 and 15 is arranged upstream of the inlet of the chopping and ejection mechanism 4.

The gathering and lifting arrangement 1 according to the invention is located frontwardly of the chopping and ejection mechanism 4. The arrangement 1 includes two cylindrical carriers 16 and 17 which are linked with one another at their upper ends by means of a beam or similar support 18. In operation, the carriers 16 and 17 are driven in rotation at a speed of approximately 150 rpm about their axes in the directions indicated by arrows E and F in FIG. 1. The carriers 16 and 17 are mounted for rotation about respective shafts 19 and 20 which are preferably inclined slightly forwardly, that is, in the direction of the advancement of the arrangement 1, as considered from below to above. The advancement direction is indicated in FIG. 1 by an arrow A. The rotational movement of the carriers 16 and 17 is derived from the rotation of the chopping and ejection mechanism 4. To this end, a shaft 21 of the wheel 9 is extended in the forward direction, and a bevel gear is mounted thereon for rotation therewith, this bevel gear 22 meshing with a further bevel gear 23 which is mounted for shared rotation on a substantially vertical shaft 24. At its upper end, the shaft 24 carries a pulley 25 about which there is trained a transmission belt 26 which drives the carrier 16, as indicated in FIG. 2. The other carrier 17 is driven from the carrier 16 by means of another shaft 27 which is accommodated within the support or beam 18. At each of its ends, which is received in a respective casing 28 or 29, the shaft 27 is equipped with a bevel gear which meshes with a crown gear secured to the associated carrier 16 or 17.

At its lower portion, each of the carriers 16 and 17 has affixed thereto a respective flexible deformable skirt 30 or 31 which is operative for gathering and lifting the forage from the ground, such forage including, for instance, cut green herbage which is eventually to be ensilaged. In operation, the skirts 30 and 31 enter underneath the forage, such as cut herbage, and due to their flexibility closely follow any irregularities of the ground, and transport such forage in general in the rearward direction on their upper surfaces. Consequently, the forage is being gathered directly, without being dragged over the ground. This dispenses with the need for using a windrowing machine and saves the forage from contamination by earth. The skirts 30 and 31 are made of rubber, synthetic plastic material or other materials of similar properties. Each of the skirts 30 and 31 is shaped substantially like a truncated cone and is provided at its periphery with projections 32 which enhance the capability of the skirt 30 or 31 to engage the forage. The projections 32 of the skirt 30 mesh or interleave with those of the skirt 31 and the paths of movement thereof slightly overlap. Due to this overlap, all forage lying on the ground is gathered and lifted, even that which happens to lie at the region of overlap. Furthermore, ribs 33 are provided on the upper surface of the skirts 30 and 31, their purpose being to assist in moving and clearing the cut herbage. For the same purpose, entraining elements 34 are provided on the walls 35 and 36 of the carriers 16 and 17.

In accordance with the present invention, the skirts 30 and 31 cooperate with means 37 for guiding the gathered forage toward the receiving device 2 which, in the illustrated example of FIG. 1, is constituted by the chopping and ejection mechanism 4. The guiding means extend from underneath the flexible deformable skirts 30 and 31 substantially all the way to the chopping and ejecting mechanism 4. Their leading end extends between the carriers 16 and 17 on a width substantially equal to the width between the shafts 19 and 20. The guiding means 27 assist in moving the cut forage toward the mechanism 4 and prevent losses of the forage along the way. The guiding means includes or is mounted on two skids 38 and 39 which extend forwardly to underneath the skirts 30 and 31. The provision of the skids 38 and 39 facilitates the movement of the arrangement 1 on the ground and ensures that the distance between the guiding means 37 and the ground remains constant. The lower ends of the shafts 19 and 20 which mount the carriers 16 and 17 for rotation are connected to the respective skids 38 and 39 which is situated underneath the respective skirt 30 and 31. This connection gives the arrangement 1 according to the invention a considerable and desirable rigidity.

In the example of the arrangement 1 as shown in FIG. 1, the guiding means 37 is constituted by a plate 40. This plate 40 can be made, for example, of steel sheet. A substantially horizontal roller 41 is arranged at the forward end of the plate 40 and underneath the skirts 30 and 31. The roller 41 is mounted at its axial ends in bearing blocks constituted by elongated lateral members 42 and 43 for free rotation therein, the members 42 and 43 extending from the frame 3 of the forage harvester 2 all the way to the skids 38 and 39. When in operation, the roller 41 is driven in rotation in the direction of arrow G by the skirts 30 and 31 which frictionally engage the same. Because of its rotational movement, the roller 41 transfers the gathered forage from the skirts 30 and 31 to the guiding plate 40 and prevents a buildup thereof at the forward end of the plate 40. Furthermore, the forward end of the plate 40 is curved downwardly so as not to present a sharp edge at which the forage could accumulate. This downward curvature is shown in FIG. 2. The roller 41 is provided with entraining portions 44, such as ribs, which assist in the transmission of motion from the skirts 30 and 31 to the roller 41, on the one hand, and aid in the transfer of forage to the guiding plate 40, on the other hand. The plate 40 is reinforced by a profiled element 45 which is situated at its lower surface.

Figure 3:
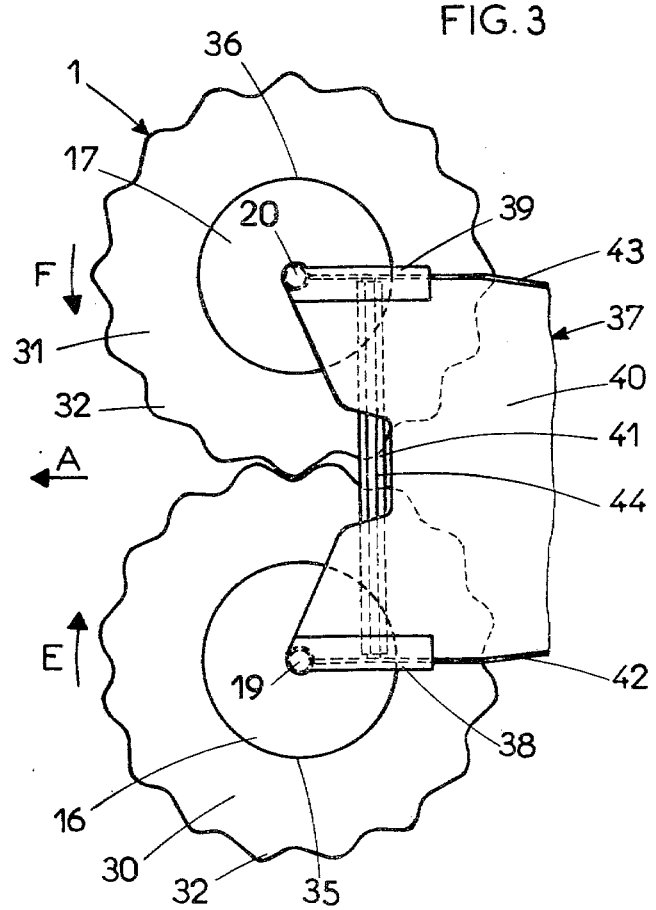
FIG. 3 is a partial bottom plan view of the arrangement of FIG. 1 but showing a modified construction.

In the modification depicted in FIG. 3, the plate 40 partly extends under the roller 41. More particularly, the plate 40 extends under the roller 41 at the vicinity of the axial ends of the latter, the central part of the roller 41 remaining unobstructed toward the ground. As a result of this construction, the axial ends of the roller 41 are protected from coming into contact with vegetation or other elements still lying on the ground which could slow down or interfere with the rotation of the roller 41.

The arrangement 1 is attached to the forage harvester 2 by means of bolts. To this end, the harvester 2 is provided with two connecting plates 46 and 47 which fittingly cooperate with similar connecting plates 48 and 49 which are secured to the elongated lateral members 42 and 43 of the arrangement 1. The connecting plates 48 and 49 also have two curved elongated members 50 and 51 attached thereto, these members 50 and 51 extending toward the beam or support 18 on which the carriers 16 and 17 are mounted. The elongated members 50 and 51 further increase the rigidity of the arrangement 1 in an advantageous manner. The arrangement 1 can be mounted, in the alternative, and in the same manner, on any other receiving device such as, for instance, a baler or a trailer.

As shown in FIGS. 1 and 2 only in phantom lines for the sake of clarity, a deflection cover 52 is arranged upwardly of the skirts 30 and 31 and of the guide plate 40. This cover 52 may be made of sheet metal or of canvas or of another material of similar properties. The cover 52 insures that the forage is not thrown in the upward direction. Preferably, this deflection cover 52 is affixed to the beam 18 which interconnects the carriers 16 and 17.

An entraining device 53 is disposed between the carriers 16 and 17 which carry the skirts 30 and 31 and the chopping and ejection device 4. This entraining device 53 is constituted by a pair of drums 54 and 55 which are vertically oriented and arranged between two supports 56 and 57. The drums 54 and 55 are driven in rotation from the substantially vertical shaft 24 which carriers a spur gear 58 for this purpose. The drums 54 and 55 are provided with elongated ribs 59 which engage and move the forage. Thus, in operation, the drums 54 and 55 assist in moving the forage on the guiding plate 40.

Figure 4:
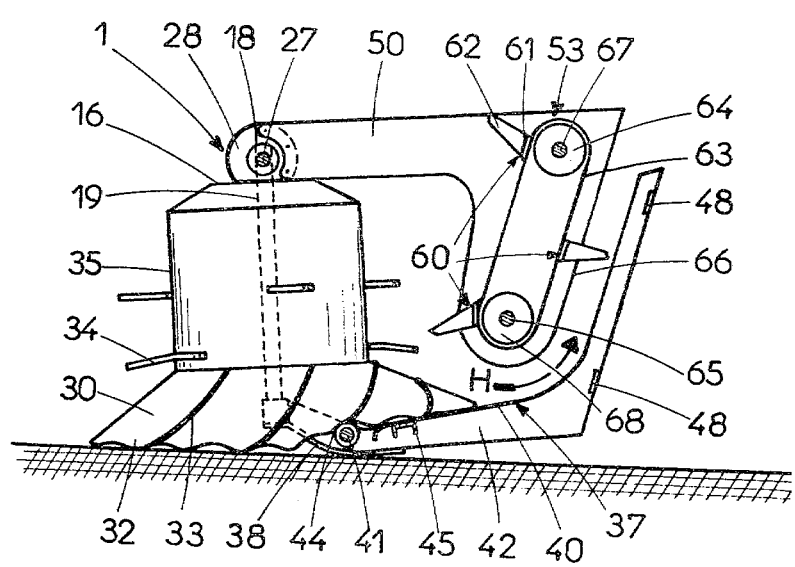
FIG. 4 is a view similar to FIG. 2 but showing a further modification.

In the modification shown in FIG. 4, the entraining device 53 is at least partially horizontally oriented. It is constituted by elevator rakes 60. This arrangement is particularly suited for use with self-loading trailers. The rakes 60 include a horizontal bar 61 to which there is affixed a plurality of tines 62. The bars 61 are mounted on chains 63 which are trained about sprockets 64 and 65 which are vertically offset with respect to one another. Guiding elements 66 substantially parallel with the chains 63 are disposed between the tines 62. The guide plate 40 is extended in the upward direction to form a channel with the guiding elements 66.

During the operation, the rakes 60 are driven for movement in the direction of an arrow H around substantially horizontal shafts 67 and 68. Thus, the rakes 60 move the forage gathered and lifted by the skirts 30 and 31 into the aforementioned channel and push it subsequently into the trailer to which the arrangement 1 is affixed. The rakes 60 are driven from the trailer in a manner which is completely conventional.

Figure 5:
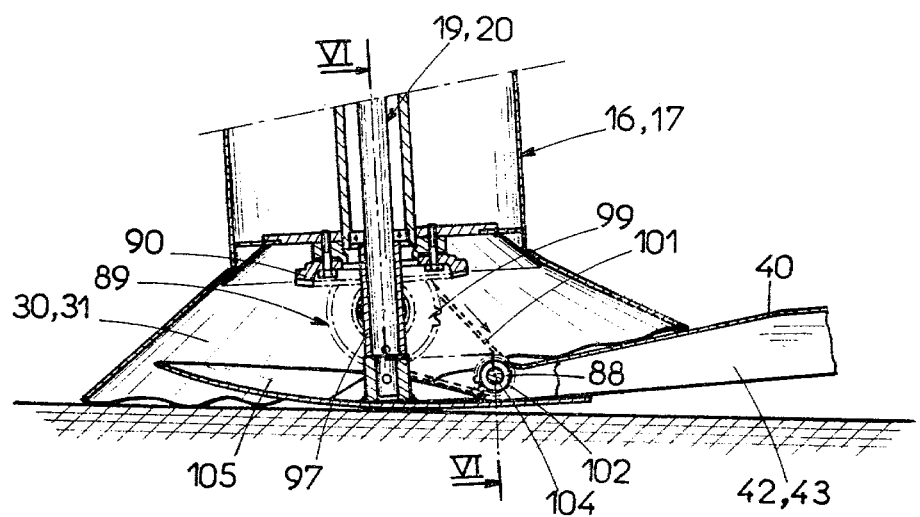
FIG. 5 is a longitudinal sectional view of the lower portion of a rotary carrier equipped with means for driving a roller which is situated frontwardly of a guiding plate.
Figure 6:
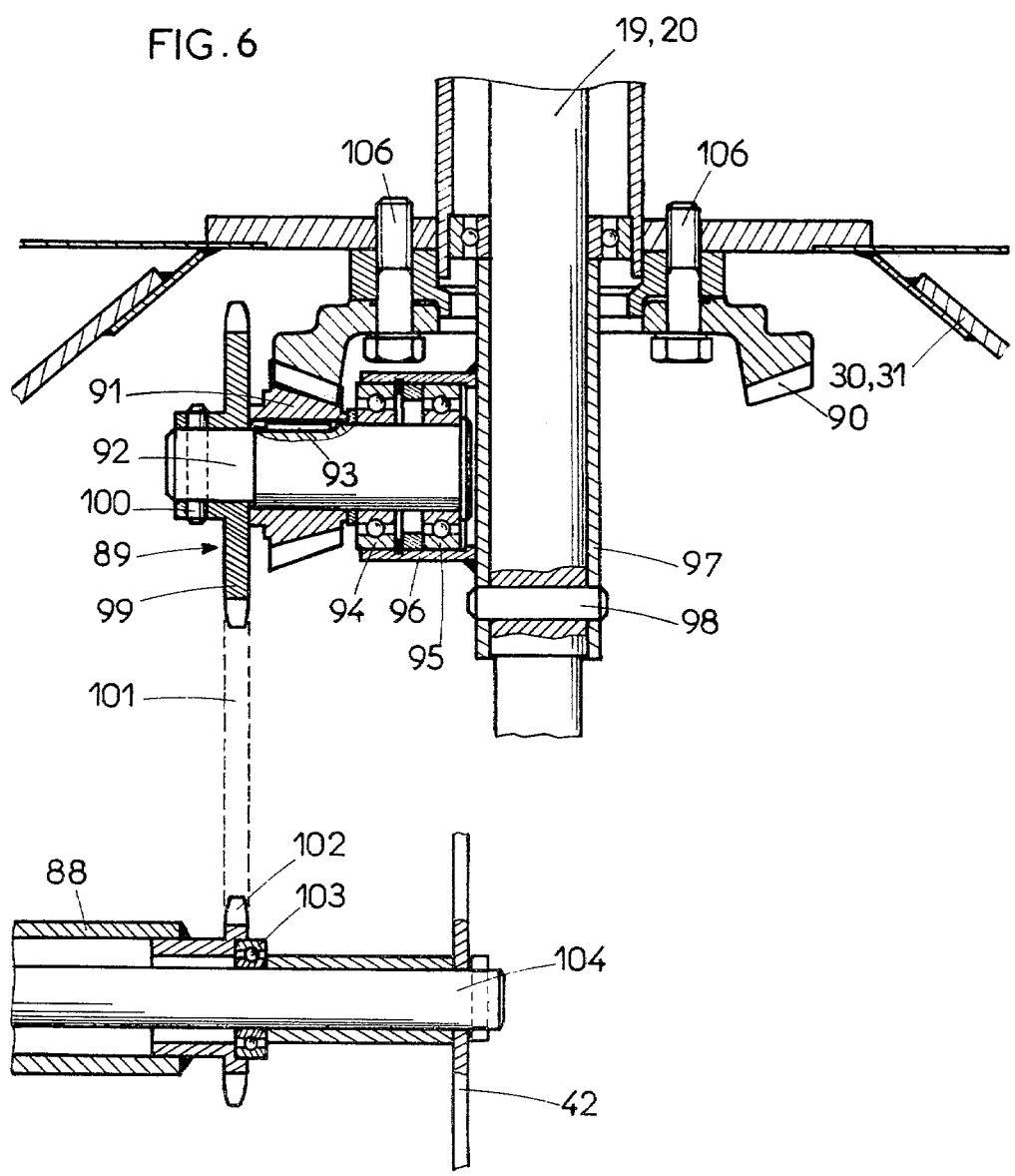
FIG. 6 is a sectional view at a larger scale taken along the line VI—VI of FIG. 5.

In the modified construction illustrated in FIGS. 5 and 6, a roller 88, which is driven in rotation by means for driving the same in a positive and reliable manner, is disposed at the forward end of the guiding plate 40 which is situated underneath the skirts 30 and 31. Advantageously, the rotary motion of the roller 88 is derived from one of the carriers 16 or 17. As may particularly be ascertained from FIG. 6, the rotary carrier 16 has at its underside a toothed crown wheel 90 which meshes with a bevel gear 91. The crown gear 90 is affixed to the carrier 16 by means of screws 106. The bevel gear 91 is affixed to a shaft 92 by means of a key 93. As the bevel gear 91 rotates, the shaft 92 rotates as well in ball bearings 94 and 95 which are accommodated on a cylindrical part 96 that is welded to a tube 97 which surrounds the shaft 19 of the carrier 16, the tube 97 being immobilized by means of a pin 98.

The shaft 92 also carries a sprocket 99 which is immobilized on the shaft 92 by means of a pin 100. This sprocket 99 has a chain 101 trained thereabout, the chain 101 also being trained about another sprocket 102 which is affixed to the roller 88. The roller 88 is mounted on a shaft 104 by means of ball bearings 103, the shaft 103 being supported at its axial ends in the longitudinal members 42 and 43 which have been discussed above. Owing to the provision of this drive means, the roller 88 assures, during the operation of the arrangement 1, that any forage arriving between the skirts 30, 31 of the rotary carriers 16, 17 passes smoothly onto the guide plate 40. The driving means 89 may also be constructed as a set of bevel gears, one of which is affixed to the rotary carrier 16 and the other to the roller 88. When this construction is being used, the roller 88 is arranged substantially at the level of the rotating shafts 19 and 20 of the rotary carriers 16 and 17.

The outer periphery of the roller is preferably smooth. Under these circumstances, the roller 88 does not exhibit any sharp edges on which the forage could otherwise become caught. Moreover, in order to facilitate the transfer of the forage from the roller 88 onto the guide plate 40, the forward or leading end of the plate 40 is bent into the shape of a scraper which extends substantially tangentially to to outer periphery of the roller 88. As a result of this shape, the guide plate 40 receives all the forage without even slightly hindering the forage in its movement.

The aforementioned driving means 89, that is, the crown gear 90, the bevel gear 91, the sprockets 99 and 102, and the chain 101, are protected from below by a skid 105 which is situated underneath the rotary carrier 16. As shown in FIG. 5, the forward edge and the lateral portions of the skid 105 are raised and extend substantially into the vicinity of the skirt 30. Consequently, the skid 105 forms a shield or screen which prevents soil or bits of the cut forage from reaching and soiling the driving means 89. Additionally, as a result of this shape, the skid 105 renders it easier than before to move the entire arrangement 1 over the ground and at always the same distance therefrom.

The modifications illustrated in FIGS. 7 to 11 have a certain amount of parts in common with the modifications described above so that the same reference numerals as before will be used for identifying these common parts.

Figure 7:
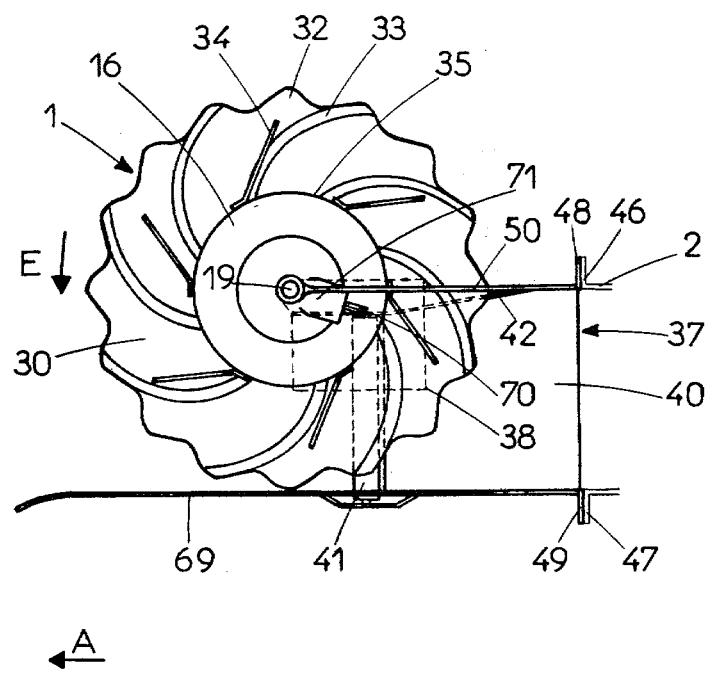
FIG. 7 is a top plan view of the arrangement of the invention showing another modification.

In the modification illustrated in FIG. 7, the arrangement 1 for gathering and lifting cut herbage lying on the ground includes a single carrier 16 which has affixed to its lower end the flexible deformable skirt 30. A deflecting wall 69 is arranged at the side of the carrier 16. The skirt 30 operates in the same manner as discussed above. The deflecting wall 69 extends substantially from the front of the carrier 16 to the associated receiving device 2. It prevents the already lifted forage from falling back on the ground at the side of the carrier 16. The vertical dimension of the wall 69 is substantially the same as that of the carrier 16.

As in the basic construction and modifications depicted in FIGS. 1 to 6, a guide plate 40 is provided which extends under the skirt 30 of the carrier 16. Similarly to the above-discussed examples, a roller 51, mounted for rotation in the elongated member 42 and in the deflecting wall 69, is situated frontwardly of the plate 40 in order to aid in the transfer of the forage from the skirt 30 onto the plate 40. A skid 38 is also arranged underneath the skirt 30. The carrier 16 is rotated by means of a splined portion of a shaft which extends into an angular drive unit 71 arranged upwardly of the carrier 16. The arrangement 1 is also mounted on the receiving device 2 by means of bolts and connecting plates 46, 47, 48, and 49.

In FIGS. 8 and 9, the guiding means 37 associated with the skirts 30 and 31 mounted on the carriers 16 and 17 is constituted by a conveyor belt 72. The conveyor belt 72 is trained around two rollers 73 and 74, one of which is situated at least in part underneath the skirts 30 and 31 mounted on the carriers 16 and 17, while the other is situated near to the receiving device 2. During the operation of the arrangement 1, the conveyor belt 72 is driven to perform a continuous movement by the skirts 30 and 31. Thus, the conveyor belt 72 carries the objects transferred thereto from the skirts 30 and 31, which have previously gathered and lifted the forage, to the receiving device 2. Advantageously, the conveyor belt is equipped with entraining portions 75 which augment the transporting function of the conveyor belt 72.

The two carriers 16 and 17 are caused to rotate by a transmission deriving its motion from the receiving device 2. This transmission or drive includes an intermediate shaft which is omitted from the drawing and which is connected to the splined portion of a shaft 76, and gears which are accommodated in drive units 77, 78, and 79.

Furthermore, lateral guides 80 and 81 are arranged between the respective carrier 16 and 17 and the receiving device 2. These guides 80 and 81 are shaped like rods affixed to respective arms 82 and 83 which are attached to the bent elongated members 50 and 51. A space is provided between the rods to allow foreign bodies, such as stones, which may be mixed with the forage, to pass therethrough and thus to leave the arrangement 1. The leading or forward end of each of the rods is curved in the outward direction to avoid the possibility that forage could become caught thereon. The rods can extend as far as the point located intermediate the entraining members 34 that are mounted on the carriers 16 and 17, so as to dissociate any forage which may have become caught on the entraining members 34 from the same.

Figure 11:
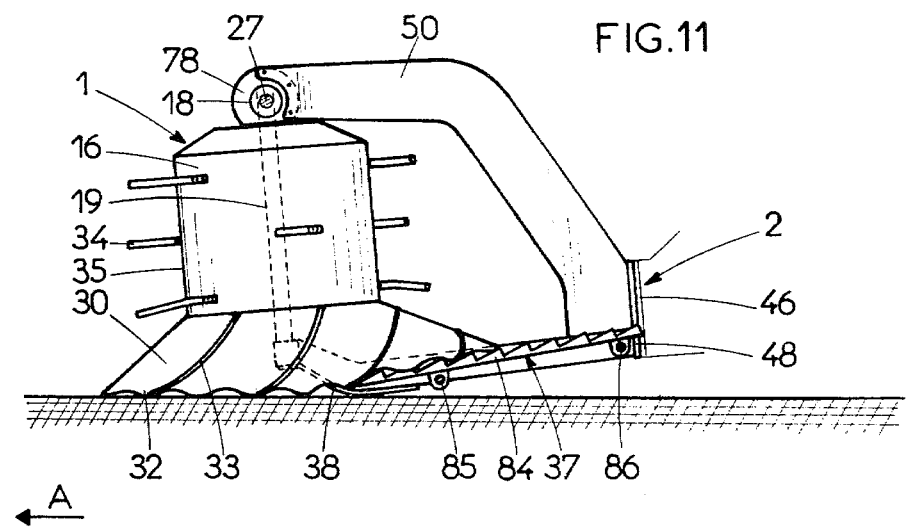
FIG. 11 is a sectional view taken along line XI—XI of FIG. 10.
Figure 10:
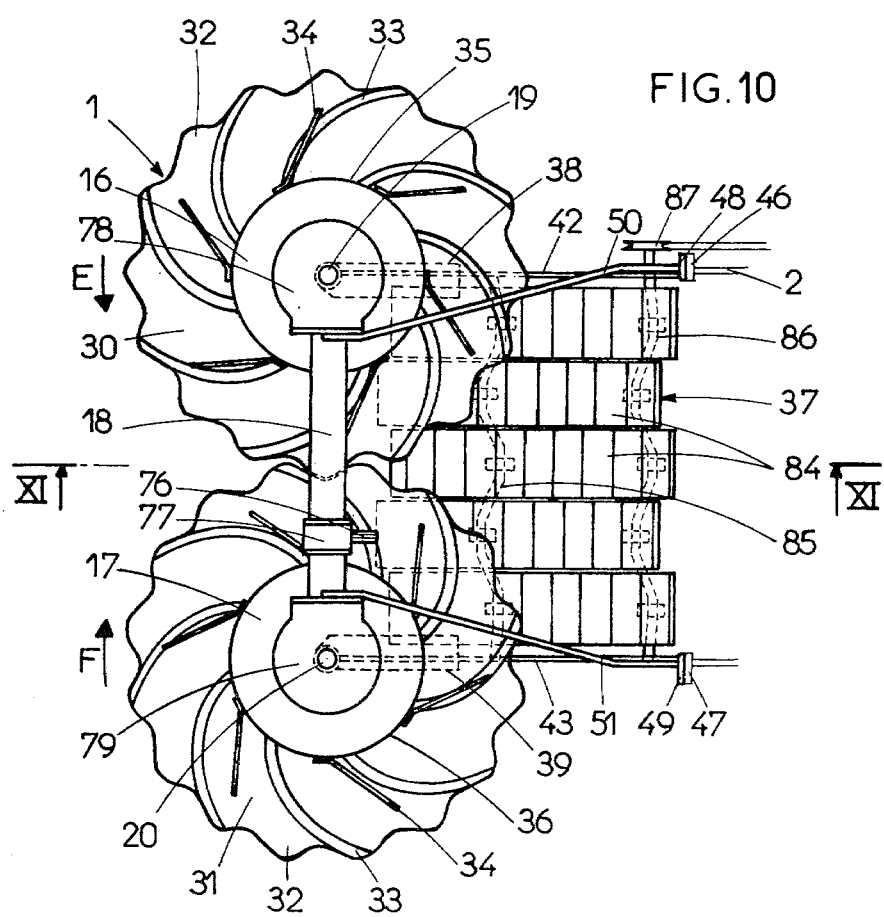
FIG. 10 is a top plan view of the arrangement of the invention as further modified.

In the modification shown in FIGS. 10 and 11, the guiding means 37 which is associated with the skirts 30 and 31 mounted on the carriers 16 and 17 is constituted by oscillatory members 84. The oscillatory members 84 are being oscillated by means of the crankshafts 85 and 86. The crankshaft 85 is rotated by means of a pulley 87 which is mounted at one end of the crankshaft 85. Because of their oscillating movement as imparted thereto by the crankshafts 85 and 86, the oscillatory members 84 are effective to move the forage transferred thereto from the skirts 30 and 31 toward the receiving device 2.

The gathering and lifting arrangements 1 discussed above can be used in conjunction with a variety of other machines. They can even be transferred by the operating personnel from one machine to another as the need arises.

We wish it to be understood that we do not desire to be limited to the exact details of construction shown and described, for obvious modifications will occur to a person skilled in the art.

Having thus described the invention what we claim as new and desire to be protected by Letters Patent is as follows:

1. An arrangement for gathering forage situated at the level of the ground, particularly cut herbage, comprising, in combination, a support movable in an advancing direction on the ground;

at least one carrier mounted on said support for rotation about an upright axis which is slightly inclined in the advancing direction with respect to the vertical;

rotating means for rotating said carrier about said axis;

a flexible deformable skirt mounted near the lower portion of said carrier for rotation therewith and adapted to make contact with the forage on the ground at its forward section to gather the forage;

receiving means arranged near the rear of said carrier operable for receiving the gathered forage, and a plate extending from below said skirt rearwardly to said receiving means for guiding the forage gathered by said skirt towards said receiving means.

2. An arrangement as defined in claim 1, wherein said plate comprises at least one skid rigid therewith and extending forwardly below said skirt and adapted to make contact with the forage on the ground, and further comprising mounting means for said carrier including a shaft connected to said skid.

3. An arrangement as defined in claims 1 or 2 further comprising a roller arranged near the forward end of said plate and rotatable about a substantially horizontal axis, and transmission means operatively arranged between said carrier and said roller for power transmission therebetween.

4. An arrangement as defined in claim 3, wherein said transmission means includes a crown gear mounted on a lower portion of said carrier, a substantially horizontally disposed shaft mounted on said support for rotation and meshing with said crown gear, a bevel gear and a sprocket mounted on said shaft for rotation therewith, another sprocket rigid with said roller, and a chain engaging said sprockets.

5. An arrangement as defined in claim 3, wherein said transmission means includes a first bevel gear rigid with said carrier and a second bevel gear rigid with said roller and meshing with said first bevel gear.

6. An arrangement as defined in claim 3, wherein said plate extends below the roller in the vicinity of the axial ends of said roller, so as to protect said axial ends from coming in contact with a foreign object lying on the ground.

7. An arrangement as defined in claim 3, wherein said transmission means include ribs disposed on said roller for establishing frictional contact with said skirt.

8. An arrangement as defined in claim 1, wherein said receiving means includes chopping and ejection means for the gathered forage, and operatively connecting said carrier with said chopping and ejection means for power transmission therebetween.

9. An arrangement as defined in claim 8, wherein said receiving means further includes at least one upright drum provided with ribs.

10. An arrangement as defined in claim 1, further comprising unloading means for unloading the gathered forage, including a pair of substantially horizontally disposed shafts spaced vertically from one another, entraining means operatively connecting said shafts, and a plurality of rakes mounted on said entraining means for unloading the gathered forage.

11. An arrangement as claimed in claim 1, further comprising lateral guidance means extending laterally of said plate operable for holding the gathered forage.

12. An arrangement for gathering forage situated at the level of the ground, particularly cut herbage, comprising, in combination, a support movable in an advancing direction on the ground, at least one carrier, mounting means for mounting said carrier on said support for rotation about an upright axis, said upright axis being slightly inclined in the advancing direction with respect to the vertical, rotating means for rotating said carrier about said axis, a flexible deformable skirt mounted near a lower portion of said carrier for rotation therewith, and adapted to make contact with forage on the ground at its forward section, receiving means arranged near the rear of said carrier, and at least one conveyor belt extending from below said skirt to said receiving means for guiding the forage gathered by said skirt towards said receiving means, said conveyor belt comprising at least one skid extending forwardly below said skirt and adapted to contact the forage on the ground, and wherein said mounting means for said carrier includes a shaft mounted on said skid.

13. An arrangement for gathering forage situated at the level of the ground, particularly cut herbage, comprising, in combination, a support movable in an advancing direction on the ground, at least one carrier, mounting means for mounting said carrier on said support for rotation about an upright axis which is slightly inclined in the advancing direction with regard to the vertical, rotating means for rotating said carrier about said axis, a flexible deformable skirt mounted at a lower portion of said carrier for rotation therewith, and adapted to make contact with the forage on the ground at its forward section, receiving means arranged at the rear of said carrier, an oscillating arrangement including at least one oscillatory member mounted on said support for oscillation relative thereto, and means for oscillating said oscillatory member, including a crankshaft rotably mounted on said support and connected to said oscillatory member, said oscillating arrangement including at least one skid extending forwardly below said skirt and adapted to make contact with the forage on the ground, and wherein said mounting means for said carrier includes a shaft connected to said skid.

* * * * *